United States Patent [19]

Barone et al.

[11] 4,292,188

[45] Sep. 29, 1981

[54] NON-ABRASIVE BAUXITE-BASED FIRE RETARDANT

[75] Inventors: Joseph P. Barone; Sergio A. Loynaz, both of Baltimore; Frederick W. Bauer, Bethesda, all of Md.

[73] Assignee: Martin Marietta Corporation, Bethesda, Md.

[21] Appl. No.: 44,630

[22] Filed: Jun. 1, 1979

[51] Int. Cl.$^3$ .............................................. C09K 3/28
[52] U.S. Cl. ..................................... 252/62; 162/159; 252/8.1; 252/607
[58] Field of Search .................. 252/8.1, 62, 601, 607; 162/159; 106/18.11, 18.13

[56] References Cited

U.S. PATENT DOCUMENTS

| | | | |
|---|---|---|---|
| 3,895,997 | 7/1975 | Haywood | 162/159 X |
| 3,983,040 | 9/1976 | Draganov | 252/8.1 |
| 4,077,833 | 3/1978 | Roberts | 162/176 |
| 4,126,473 | 11/1978 | Sobolev et al. | 252/8.1 X |
| 4,130,458 | 12/1978 | Moore et al. | 162/159 |
| 4,172,804 | 10/1979 | Christianson et al. | 252/8.1 X |
| 4,184,969 | 1/1980 | Bhat | 252/8.1 |

OTHER PUBLICATIONS

Hackh's Chemical Dictionary, Third Edition, 1949, pp. 102 and 376.

Primary Examiner—Herbert B. Guynn
Attorney, Agent, or Firm—Gay Chin; Herbert W. Mylius

[57] ABSTRACT

Fire retardant properties are provided for cellulose insulation materials by the addition of a fire retardant composition comprising from 60 to 85% of bauxite, from 5 to 30% dolomite, and from 5 to 30% boric acid. Loading factors of from about 20 to about 35% fire retardant are effective to meet applicable federal specifications for flame spread and smoldering.

18 Claims, No Drawings

NON-ABRASIVE BAUXITE-BASED FIRE RETARDANT

BACKGROUND OF THE INVENTION

This invention relates to a fire-resistant cellulosic insulation. Fire retardancy is achieved by the addition of a mixture of bauxite, dolomite, and boric acid to the cellulose insulation.

Finding effective, efficient, and safe insulating materials is one of the major problems of the building industry today. Faced with escalating energy costs and increasing costs of construction, the necessity for an effective insulation material which is inexpensive to manufacture and apply has become obvious. In addition, regulations relating to both the safety and flammability of building products have become far more stringent, and will contine to be more restrictive as the public becomes increasingly aware of the hazards inherent in presently utilized insulation materials. For example, asbestos and fiber glass have been identified as possible carcinogenic agents, and face potential abandonment by the construction industry. On the other hand, such insulation materials as cellulose fiber and shredded newspaper, while providing highly efficient sound and heat insulation, have been largely unacceptable due to flammability.

The applicable Federal Government Services Administration Specification, HH-I-515D, requires cellulose insulation to achieve a critical radiant flux of greater than 0.12 watts/cm$^2$. Critical radiant flux, a measure of flame spread, is measured under controlled conditions, in accordance with the Specification, by placing a given amount of insulation loosely in a specimen tray, which is then placed in a chamber at a 30° angle to an air-gas fueled radiant heat energy panel. A flame is applied to the specimen by a propane burner for five minutes, after which flame spread is measured, and the distance converted to watts/cm$^2$ critical radiant heat flux by comparison to a standardized flux profile curve.

In addition, it is known that a major cause of fires in houses with cellulose insulation is from smoldering. Accordingly, a specification for smoldering has been incorporated in HH-I-515D, as determined by the "smolder box" test. In this standardized test, the insulation and fire retardant are placed in a metal box 20 cm square and 10 cm deep, said box resting on a glass fiberboard pad. A lighted unfiltered cigarette, 85±2 mm long, with a packing density of 0.270±0.020 g/cm$^3$ and a total weight of 1.1 ±0.1 gm, is then placed upright in the middle of the insulation, and allowed to smolder for two hours. To pass the test, the weight loss of the insulation material may not exceed 15%, and the smoldering must be confined to less than 5 cm from the walls of the container.

In addition to the GSA Specification for cellulose insulation set forth by HH-I-515D, there are approximately twenty additional tests required for Underwriters Laboratory (UL) approval.

An ideal fire retardant composition for cellulosic insulation should be odorless, and it must not be hygroscopic, poisonous, or corrosive; it should retain its effectiveness permanently, and must adhere to the basic insulation material so firmly as to prevent its removal during ordinary usage, e.g. bending, folding, or loose fill application; it should not only prevent burning when exposed to flame or glowing, but should act to extinguish burning or smoldering; and it should do so without the release of any by-products or products of combustion which are poisonous, corrosive, or otherwise injurious.

The market for cellulose insulation is large, with 1977 cellulose insulation production estimated by the Department of Commerce at about 835,000 tons. There is general agreement that this market should expand for some time, until the retrofit market is saturated, and then decline to meet the requirements of the construction industry for new buildings. Accordingly, there has been considerable interest in developing a safe, effective, and inexpensive fire retardant additive for cellulose insulation.

DESCRIPTION OF THE PRIOR ART

Boric acid has long been considered an appropriate material for this purpose, but is costly, resulting in attempts to reduce costs by blending with other materials such as borax. Such blended materials have included, for example, borax, ammonium borate, ammonium phosphate, and alumina trihydrate.

A recent patent, U.S. Pat No. 4,130,458, to Moore et al. proclaims a synergistic effect obtained by combining a $B_2O_3$ source, selected from the group consisting of boric acid, $B_2O_3$, and ammonium borate, with alumina trihydrate for fire proofing a combustible fibrous product. The patent is specific to a wood-based product, such as hardboard, comprising cellulosic fibers, alumina trihydrate in an amount of about 10 to 60% by weight of the finished product, and a $B_2O_3$ source in an amount of about ⅓ to 7% by weight of the finished product.

Sobolev et al., in U.S. Pat. No. 4,126,473, disclose the use of a mixture of bauxite, naturally-occurring boron-containing materials (e.g. colemanite or ulexite), and a sulphate or phosphate-containing inorganic salt for flame proofing cellulosic boards. Panusch et al., U.S. Pat. No. 4,076,580, disclose a flame proofing composition comprising 13–70% by weight ulexite (NaCaB$_5$O$_9$.8H$_2$O), with the balance being alumina trihydrate, primarily for use in cellulosic boards. Pitts, U.S. Pat No. 3,865,760, discloses the use of Colemanite (Ca$_3$B$_6$O$_{11}$.5H$_2$O) as a flame retardant, with either calcium carbonate or alumina trihydrate filler, for rubber or plastic compositions. In addition, U.S. Pat.No. 4,077,833 of Roberts discloses the use of bauxite alone as a fire retardant, for hard compressed fiberboard produced from wood fibers.

U.S. Pat. No. 2,381,487, Cook et al., teaches treatment of fibrous materials to render them fire resistant, utilizing a composition of a borate, an aliphatic carboxylic acid, and an Al$_2$O$_3$ containing compound. Orth et al., in U.S. Pat. No. 3,245,870, teach a process for producing a water-resistant and fire-retardant lignocellulosic product (such as hardboard) by treatment with buffered boric acid and optional fungicide, size, resin, sodium aluminate, and starch. Further, Cooper et al., in U.S. Pat. No. 3,367,863, teach a fire-extinguishing agent made by heating an aqueous mixture of aluminum acid phosphate and a boron oxide source.

In addition to the above, the following patents illustrate the use of boric acid or other boron compounds for fire-proofing a product containing a flammable fibrous product:

Eichengrun—U.S. Pat. No. 1,612,104
Vivas—U.S. Pat. No. 1,612,676
Edwards—U.S. Pat. No. 1,778,147

Vivas—U.S. Pat. No. 1,839,136;
Desper—U.S. Pat. No. 1,879,128;
Wiener et al.—U.S. Pat. No. 1,937,679;
Quinn—U.S. Pat. No. 2,030,653;
Hopkinson—U.S. Pat. No. 2,250,483;
Jones et al.—U.S. Pat. No. 2,452,055;
Jones—U.S. Pat No. 2,523,626;
Nielson—U.S. Pat. No. 2,526,083;
Farber—U.S. Pat No. 2,573,253
Lauring—U.S. Pat. No. 2,594,937
Van De Zande—U.S. Pat. No. 2,769,729;
Lauring—U.S. Pat. No. 2,849,316;
Dunn et al.—U.S. Pat. No. 2,875,044;
Hunter et al.—U.S. Pat. No. 3,028,411;
Hunter et al.— U.S. Pat. No. 3,131,071;
Videen—U.S. Pat. No. 3,202,570;
Behr et al.—U.S. Pat. No. 3,220,858;
Pataki et al.—U.S. Pat. No. 3,321,421;
Draganov—U.S. Pat. No. 3,378,381;
Chase—U.S. Pat. No. 3,438,847;
Humphrey—U.S. Pat. No. 3,524,761;
Dunay et al.—U.S. Pat. No. 3,553,132;
Ashton—U.S. Pat. No. 3,560,253;
Bell—U.S. Pat. No. 3,619,352;
Woods—U.S. Pat. No. 3,816,307;
Cavazos et al.—U.S. Pat. No. 3,819,517;
Arthur et al.—U.S. Pat. No. 3,821,196; and
O'Shaugnessy—U.S. Pat. No. 3,897,387.

The following patents disclose the use of alumina hydrate or alumina trihydrate for making a fire-retardant for flammable fibrous products:
Becher—U.S. Pat. No. 2,108,761;
Becher—U.S. Pat. No. 2,611,694;
Sanderford et al.—U.S. Pat. No. 3,699,041;
Burton—U.S. Pat. No. 3,741,929; and
Nicodemus et al.—U.S. Pat. No. 3,772,455

These references, while teaching that various chemicals may impart fire retardancy to flammable cellulosic materials, fail to recognize the desirability of combining the specific mixture of bauxite, boric acid, and dolomite to obtain a wider temperature range over which effective fire retardancy may be obtained. These references also fail to recognize the applicability of a fire retardant composition, such as set forth herein, to a loose cellulosic insulation material.

SUMMARY OF THE INVENTION

An object of the present invention is to provide a cellulosic insulation material having improved flame retardant properties, and improved flame spread and smoldering characteristic. It is a further object of this invention to provide an inexpensive additive for incorporation into cellulose insulation to provide improved fire retardancy.

It is also an object of this invention to provide a flame-retardant cellulosic material which is substantially less costly than those previously available, while capable of exceeding all applicable codes and specifications for use.

It is also an object of this invention to provide a cellulosic product having improved resistance to flame spread and smoldering characteristics resulting from the combination of bauxite, dolomite, and boric acid.

In brief, these and other objects of the present invention are achieved by incorporating an additive comprising from 60 to 85% bauxite, 5 to 30% dolomite, and 5 to 30% boric acid in the desired cellulosic material such that the additive comprises from about 20 to about 35% by weight of the final product.

It is preferred to prepare the cellulosic product of this invention by a dry process, in which the dry additive components may be premixed in powder form, and added at an appropriate time to the fibrous cellulose. Thus, the additive may be prepared at one location, packaged, and shipped to a remote site for addition to the cellulosic material to be treated. Such addition is preferably accomplished by loosely blending the fibrous material with moisture addition of from about 6 to about 12% water in final product along with the dry additive powder, although it is possible to utilize known alternate techniques, such as by vacuum impregnation into a preformed dry fibrous mat.

DESCRIPTION OF PREFERRED EMBODIMENTS

In selecting an additive for fire retardancy, protection at different temperature levels is desirable. For example, boric acid is known to commence decomposition at below 200° C., releasing water of hydration, and to have released essentially all available water at temperatures below 350°. In addition, boric acid melts at a relatively low temperature, about 450° C., forming an inert protective glaze over the flammable material. As demonstrated in Table I, hereinafter, the Loss of Ignition (LOI) of boric acid is achieved principally within the temperature range of 100 to 350° C. Similarly, alumina trihydrate ($Al_2O_3.3H_2O$ or $Al(OH)_3$) commences loss on ignition at above 200° C., and essentially completes water release below 600° C., with little effectiveness above or below this temperature range.

In seeking an economical but efficient fire retardant composition, it was considered desirable to broaden the effective temperature range. To bolster lower temperature water release to assist in quenching a fire in the earliest stages, it was surprisingly found that bauxite is slightly more effective below 200° C., and between 300° and 400°, than the more purified (and far more expensive) alumina trihydrate. The presence of impurities in the form of free silica, clay, silt, and iron hydroxides actually appears to assist in the earliest release of $H_2O$, as illustrated in Table I, comparing Loss on Ignition of alumina trihydrate and Boke bauxite below 200°C. Moreover, bauxite (primarily alumina dihydrate, or a mixture of trihydrate and monohydrate) offers a major cost advantage over alumina trihydrate as an additive to boric acid. Bauxite is readily available commercially, and is distributed abundantly in various geographical locations. Commercial bauxite may contain from 28 to 33% water, composed of water of hydration and occluded moisture, as well as water of hydration present in mineral impurities. For utility as a fire retardant for cellulosic insulation, it is desirable that the bauxite have a particle size range of from about 0.3 to about 0.02 mm, preferably from 0.08 to 0.04 mm.

Boric acid is similarly available commercially, in a variety of grades and purities. While alternate sources of $B_2O_3$ may be utilized, such as borax or various borates, boric acid is preferred for the present invention. Concerning particle size, it has been found that satisfactory results may be obtained when the average particle size of the boric acid is kept within the range of from about 0.50 mm to about 0.04 mm, and preferably from about 0.30 mm to about 0.075 mm.

A mix component capable of high temperature release, i.e. above 500°C., was also deemed desirable. After some experimentation, dolomite ($MgCO_3$.-

$CaCO_3$) was found to be most effective, releasing carbon dioxide at temperatures above about 600° C., as illustrated in Table I. In addition to possessing high-temperature fire extinguishing characteristics, dolomite is far less expensive than either boric acid or alumina trihydrate, thus offering economic benefit as well.

Similarly, dolomite is readily available in economic form and may be obtained in various colorations and grades. A preferred form of dolomite comprises from 35 to 65% $MgCO_3$, the remainder composed chiefly of $CaCO_3$. Dolomitic limestone may also be utilized in the present invention, but the presence of magnesium carbonate has been found advantageous vis-a-vis limestone per se, calcium carbonate. Particle size should be such that the dolomite may be easily blended with the bauxite and boric acid. Accordingly, suitable average particle sizes may range from about 0.25 mm to about 0.02 mm, and preferably from 0.08 mm to 0.04 mm.

By combining boric acid with dolomite, to increase high temperature effectiveness, and with bauxite in place of alumina trihydrate, to increase low temperature Loss of Ignition, an improved fire retardant material is achieved, utilizing far more economical components. As shown by Table I, the fire retardant of the present invention achieves a higher loss on ignition at temperatures below 200° C., and a significantly greater loss on ignition between 500° C. and 1000° C., than the boric acid/alumina trihydrate composition set forth by U.S. Pat. No. 4,130,458.

Effective additive compositions have been found to comprise from about 60 to 85% bauxite, from about 5 to about 30% dolomite, and from about 5 to about 30% boric acid. Preferably, the fire retardant comprises from about 65 to about 75% bauxite, 15 to 25% boric acid, and 10 to 20% dolomite. A preferred composition comprises about 66% bauxite, 20% boric acid, and 14% dolomite. Various other components may be added if desired for specific purposes. For example, up to about 5% by weight of plaster of paris, portland cement, or clay may be utilized as a binder. When such material is used, a preferred composition comprises 65% bauxite, 20% boric acid, 12% dolomite, and 3% binder. Such compositions are also found to be non-abrasive, thus not contributing to physical breakdown of the cellulosic insulation. The fire retardant additive should be blended with cellulosic insulation in such amounts that the additive comprises at least about 20% of the weight of the final insulation product, and preferably from about 26% to about 35%. At lesser concentrations, flame spread and smolder resistance are inadequate, while at concentrations above about 35%, cellulosic insulation value is partly lost, due to the higher thermal conductivity of the fire retardant compared to cellulose. Preferred concentrations of additive are from about 28% to about 33% by weight of the fire retardant insulation material.

The cellulosic insulation to which the present invention is particularly pertinent comprises cellulosic or paper fibers which have been reprocessed and treated to be used as loose fill thermal insulation. The material is non-toxic, odorless, and non-irritating to the touch. The preferred form is essentially shredded used newspaper, thus not depleting natural resources. This form of insulation also requires far less energy to produce than mineral insulation material, such as fiber glass. Cellulose insulation normally is utilized as a fluffy, light, loose, and flowing material, which may be blown or poured into an insulatable space. In its settled form, the insulation retains a relatively low density, resulting in continued high thermal insulation efficiency, as well as effective sound insulation. Such insulation is readily distinguished from gypsum board or hardboard, which are produced from cellulosic fiber, but are of relatively high density and structural strength, and lower thermal insulation efficiency. Loose fill cellulosic fiber insulation is considered by many to be the most effective insulation material for achieving effective "R values" for thermal resistance in insulating or "reinsulating" homes or other buildings, and may be installed by simply pouring, for small areas, or by blowing in place. In addition, cellulose insulation including the fire retardant composition of the present invention is less susceptible to fire and flame spread than framing lumber, while not being so heavy as to put abnormal stress on a structure. Such fire retardant insulation does not have a corrosive effect upon other materials it is in contact with, such as metal or wood beams, and does not adversely affect the health of the applier (as fiber glass and rockwool do), or the occupant (as asbestos does).

Alternative utilities for the fire retardant of this invention include particle board or hardboard, wall board, ceiling tile, and as an additive to such materials as paints, plastic foams, asphaltic roofing, carpeting and rug backing, foam coatings for structural steel, etc.

EXAMPLE I

A preliminary laboratory experiment was conducted to determine whether the proposed fire retardant would be effective. A cellulose insulation material, as well as blends of pure cellulose with 25% by weight commercial boric acid/borax fire retardant, and a proposed retardant, comprising 70% bauxite, 15% dolomite, and 15% boric acid, were prepared in a laboratory blender. The total water and carbon dioxide content of the proposed retardant was about 28.8% water and 7.0% carbon dioxide. Equal weights of cellulose and the two blends were placed on a wire gauge, and a lit Bunsen burner placed under each. The average results for four such tests of each were that the pure cellulose ignited in an average of 0.77 minutes; the blend containing the commercial blend never ignited, but totally surface charred in 1.77 minutes; and the experimental blend never ignited, but totally charred in 4.06 minutes. This test illustrated not only the ability of the proposed retardant to prevent ignition, but also its improved resistance to charring.

EXAMPLE II

A commercially available fire retardant, based upon boric acid and borax, was analyzed and tested for Loss on Ignition. The retardant was found to be composed of borax, boric acid, calcium sulfate, carbonates, clay, and sand. The net Loss on Ignition was 25.8%, of which 6% is attributed to carbonate decomposition to carbon dioxide above 600° C. About 50% of the total LOI occurred at temperatures below 200° C. The complex nature of the mixture made exact identification of the components, and their proportions, difficult, but the mixture is believed to consist of the following:

| Compound | Weight % |
| --- | --- |
| Boric Acid ($B_2O_3 \cdot 3H_2O$) | 20-25 |
| Borax ($NaCaB_5O_7 \cdot 5H_2O$) | 15-20 |
| Sulphate ($CaSO_4$) | 15-20 |
| Carbonate ($MgCO_3 \cdot 3H_2O$, $CaCO_3$, $Na_2CO_3 \cdot 10H_2O$) | 15-20 |
| Clays | 3-5 |

-continued

| Compound | Weight % |
| --- | --- |
| Sand (SiO$_2$) | 10-15 |
| Other (Organic carbon, FeS$_2$, NaAl(SO$_4$) . 12H$_2$O, etc.) | 10-15 |

The cumulative LOI's of this fire retardant, and for sake of comparison, alumina trihydrate, boric acid,, dolomite, and borax, Boke Bauxite, are set forth in Table I. Also set forth in Table I are Losses on Ignition for a fire retardant comprising 5% boric acid, 5% borax, and 90% alumina trihydrate, as taught by U.S. Pat No. 4,130,458, and a fire retardant comprising 20% boric acid, 65% bauxite, 12% dolomite, and 3% plaster of paris, in accordance with the present invention.

between 300° and 400°, and 14% of the total Loss on Ignition occurring above 600° C.

EXAMPLE III

Samples of cellulose insulation material were blended with two fire retardant compositions by a commercial insulation manufacturer, in accordance with conventional blending techniques. One of the fire retardant compositions was a phosphate-based commercially available product, while the other was the experimental retardant composed of 67% bauxite, 19% boric acid, and 14% dolomite. Samples of blended insulation containing 0, 24, 26, and 30% by weight of the experimental fire retardant, and forcomparison 29.2% by weight of the commercial fire retardant, were subjected to smolder box and radiant panel tests as set forth hereinafter by an independent testing laboratory. In addition, flame

TABLE I

| | Comparative Differential Loss on Ignition (Cumulative Loss on Ignition) | | | | | | | |
| --- | --- | --- | --- | --- | --- | --- | --- | --- |
| Temperature °C. | Boric Acid % LOI | Alumina Trihydrate % LOI | Boke Bauxite % LOI | Dolomite % LOI | Borax % LOI | Commercial Boric Acid/Borax Fire Retardant % LOI | U.S. Pat. No. 4,130,458 % LOI | Experimental Retardant % LOI |
| 25-100 | 0.0(0.0) | 0.0(0.0) | 0.1(0.1) | 0.0(0.0) | 3.0(3.0) | 0.8(0.8) | 0.2(0.2) | 0.1(0.1) |
| 100-200 | 28.8(28.8) | 0.0(0.0) | 0.5(0.6) | 0.0(0.0) | 30.0(33.0) | 11.5(12.3) | 2.9(3.1) | 6.2(6.3) |
| 200-300 | 14.2(43.0) | 17.7(17.7) | 3.3(3.9) | 0.0(0.0) | 6.0(39.0) | 3.6(15.9) | 16.9(20.0) | 4.8(11.1) |
| 300-400 | 1.5(44.5) | 12.0(29.7) | 22.6(26.5) | 0.0(0.0) | 4.0(43.0) | 1.1(17.0) | 11.1(31.1) | 15.0(26.1) |
| 400-500 | 0.5(45.0) | 3.0(32.7) | 2.1(28.6) | 0.0(0.0) | 0.5(43.5) | 1.0(18.0) | 2.8(33.9) | 1.5(27.6) |
| 500-600 | 0.0(45.0) | 1.1(33.8) | 1.4(30.0) | 1.5(1.5) | 0.0(43.5) | 0.7(18.7) | 0.9(34.8) | 1.1(28.7) |
| 600-700 | 0.0(45.0) | 0.3(34.1) | 0.5(30.5) | 9.0(10.5) | 0.0(43.5) | 1.2(19.9) | 0.3(35.1) | 1.4(30.1) |
| 700-800 | 0.0(45.0) | 0.2(34.3) | 0.2(30.7) | 5.5(16.0) | 0.0(43.5) | 2.3(22.2) | 0.2(35.3) | 0.8(30.9) |
| 800-900 | 0.0(45.0) | 0.2(34.5) | 0.2(30.9) | 17.0(33.0) | 0.0(43.5) | 3.1(25.3) | 0.2(35.5) | 2.1(33.0) |
| 900-1000 | 0.0(45.0) | 0.1(34.6) | 0.1(31.0) | 0.5(33.5) | 0.0(43.5) | 0.5(25.8) | 0.1(35.6) | 0.2(33.2) |

As shown by Table I, about 50% of the LOI of the commercial fire retardant was achieved by heating to 200'C. This early water release is helpful to quench a fire in its early development. Bauxite by itself is seen to release slight amounts of water below 200°C., and slight amounts of water above 600°C. Accordingly, other components were considered necessary to achieve a relatively evenly distributed Loss on Ignition throughout an appreciable temperature range. As illustrated, the fire retardant of U.S. Pat. No. 4,130,458 undergoes slight LOI below 200° C., with substantial loss between 200° and 300° C., andessentially all LOI completed below 500° C. On the other hand, the experimental fire retardant of the present invention illustrates a more evenly distributed Ignition Loss, with 19% of the total loss under 200° C., 14% between 200°and 300°, 45% resistance tests were conducted, wherein 0.50 gram samples of each blend were placed on a wire gauze approximately 10 cm above a Bunsen burner. The results of this test are set forth in Table II.

TABLE II

| | FLAME TESTS OF INSULATION | | | |
| --- | --- | --- | --- | --- |
| Retardant | Trial 1 | Trial 2 | Trial 3 | Trial 4 |
| None | Ignited at 0.62 min. | Ignited at 0.45 min. | Ignited at 0.55 min. | Ignited at 0.37 min. |
| 29.2% Commercial | Ignited at 2.08 min. | Ignited at 2.83 min. | Ignited at 2.32 min. | Ignited at 1.02 min. |
| 24% Experimental | Ignited at 2.47 min. | Ignited at 1.97 min. | Never Ignited, charred at 7.0 min. | Ignited at 4.32 min. |
| 26% Experimental | Ignited at 6.47 min. | Never Ignited, Only bottom charred after 10 min. | Never Ignited, Only bottom charred after 10 min. | Never Ignited, Only bottom charred after 10 min. |
| 30% Experimental | Never Ignited, Only bottom charred after 10 min. | Never ignited, Only bottom charred after 10 min. | Never Ignited, About 75% charred after 10 min. | Never Ignited, About 75% charred after 10 min. |

As seen, the experimental fire retardant was more flame resistant than the commercial product, when present at concentrations of 26% or higher.

EXAMPLE IV

A radiant panel test was conducted in accordance with test procedures set forth by GSA Specification HH-I-515D: "Standard Method of Test for Critical Radiant Flux of Exposed Attic Floor Insulation Using a Radiant Heat Energy Source." An air-gas fueled radiant heat energy panel inclined at 30° and directed at a horizontally mounted insulation specimen was employed, with sample material poured into a specimen tray and screened to a depth of five centimeters, and a density of 2.5 pounds per cubic foot. Samples utilized were 24% experimental, 26% experimental, 30% experimental, and 29.2% commercial; wherein the experimental fire retardant and the commercial fire retardant were as previously set forth. The point of furthest flame front advance was measured and converted to watts/cm$^2$ by comparison with the standardized flux profile curve. The acceptable level of critical Radiant Flux according to Specification HH-I-515D is 0.12 watts/cm$^2$ or greater. The results of the test are set forth in Table III:

TABLE III

| Critical Radiant Flux | | |
|---|---|---|
| Sample | Trial | Critical Radiant Flux |
| 24% experimental | 1 | less than 0.11 watts/cm$^2$ |
| | 2 | less than 0.11 watts/cm$^2$ |
| | 3 | less than 0.11 watts/cm$^2$ |
| 26% experimental | 1 | 0.12 watts/cm$^2$ |
| | 2 | less than 0.11 watts/cm$^2$ |
| | 3 | 0.12 watts/cm$^2$ |
| 30% experimental | 1 | 0.15 watts/cm$^2$ |
| | 2 | 0.14 watts/cm$^2$ |
| | 3 | 0.16 watts/cm$^2$ |
| 29.2% commercial | 1 | 0.13 watts/cm$^2$ |
| | 2 | 0.13 watts/cm$^2$ |
| | 3 | 0.13 watts/cm$^2$ |

Thus, the commercial fire retardant was acceptable at levels of 29.2%, and the experimental retardant was acceptable at concentrations above about 26%.

Smoldering combustion tests of samples from the same materials were also conducted in accordance with procedures set forth by GSA Specification HH-I-515 D: "Standard Method of Test for Smoldering Combustion Characteristics of Materials Used for Thermal Insulation." In this test, the samples were placed in a metal container, with a lit cigarette placed upright in the middle thereof, and allowed to smolder until self-extinguished. The results of this test are set forth in Table IV.

TABLE IV

| Smolder Box Test Results | | |
|---|---|---|
| Sample | Trial | Weight Loss (%) |
| 24% experimental | 1 | 0.4 |
| | 2 | 35.3 |
| | 3 | 32.7 |
| 26% experimental | 1 | 28.6 |
| | 2 | 30.8 |
| | 3 | 0.0 |
| 30% experimantal | 1 | 27.8 |
| | 2 | 24.8 |
| | 3 | 0.6 |
| 29.2% commercial | 1 | 59.3 |
| | 2 | 65.7 |
| | 3 | 67.9 |

In light of inconsistent results, rechecks were conducted on Samples 1, 2, and 3, containing 24, 26, and 30% by weight of experimental fire retardant:

TABLE V

| Smolder Box Verification | | |
|---|---|---|
| Sample | Trial | Weight loss - % |
| 24% experimental | A | 45.6 |
| | B | 41.8 |
| | C | 42.1 |
| 26% experimental | A | 38.1 |
| | B | 30.1 |
| | C | 38.3 |
| 30% experimental | A | 28.4 |
| | B | 0.8 |

TABLE V-continued

| Smolder Box Verification | | |
|---|---|---|
| Sample | Trial | Weight loss - % |
| | C | 13.2 |
| | D | 31.6 |
| | E | 1.1 |
| | F | 1.4 |

The average of nine smolder box tests of the experimental retardant at 30% concentration was 14% weight loss. An acceptable level of performance is below 15% weight loss. The inconsistencies of the results were believed to be the result of insufficient blending of fire retardant and cellulosic material, which was correctable by finer grinding of the bauxite utilized, greater blending, and by addition of a small amount of binder.

The above commercial and experimental compositions (24, 26 and 30% by weight fire retardant) were prepared in a typical hammer mill machine. Blending of the experimental fire retardant with cellulose occured for only short times (less than about 5 minutes of operation) before a sample was removed for testing. By contrast, the commercial fire retardant cellulose sample was obtained after extensive operation time (several hours). Thus, the full potential of the experimental blends was probably not achieved, due to insufficient operating time required to reach a steady-state level. Accordingly, the above weight percents necessary to pass the radiant panel and smolder box tests are probably higher than one would reasonably expect for prolonged, typical commercial manufacturing, using the experimental fire retardant.

The invention has been described with respect to specific examples and illustrative embodiments, but it is to be understood that the invention is not to be thusly limited. It is evident that one of ordinary skill in the art will readily recognize equivalents and substitutes without departure from the spirit of the invention or the scope of the claims which follow.

We claim:

1. A fire retardant composition comprising from about 60 to about 85% by weight bauxite, from about 5 to about 30% boric acid, and from about 5 to about 30% dolomite.

2. The composition of claim 1, comprising from 65 to 75% by weight bauxite, from 15 to 25% boric acid, and from 10 to 20% dolomite.

3. The composition of claim 1, wherein said dolomite comprises from 35 to 65% MgCO$_3$.

4. The composition of claim 1, further comprising up to 5% by weight of a binder selected from the group consisting of plaster of paris, Portland cement, and clay.

5. The composition of claim 1, wherein said bauxite is present in the form of particles ranging in size from 0.3 mm to 0.02 mm.

6. The composition of claim 1, wherein said boric acid comprises particles ranging in size from 0.5 mm to 0.04 mm.

7. The composition of claim 1, wherein said dolomite is present in the form of particles ranging in size from 0.25 mm to 0.02 mm.

8. A cellulosic thermal insulation comprising cellulose and a fire retardant amount of an additive material comprising from 60 to 85% by weight bauxite, from 5 to 30% boric acid, and from 5 to 30% dolomite.

9. An insulation as set forth in claim 8 wherein said additive material comprises from about 20 to about 35% by weight of the insulation.

10. An insulation as set forth in claim 9, wherein said additive material comprises from about 28% to about 33% by weight of the insulation.

11. An insulation as set forth in claim 10, wherein said additive material comprises from 60 to 75% by weight bauxite, from 15 to 25% boric acid, and from 10 to 20% dolomite.

12. An insulation as set forth in claim 9, wherein said cellulose comprises recycled paper.

13. An insulation as set forth in claim 12, wherein said dolomite comprises from 35 to 65% $MgCO_3$.

14. An insulation as set forth in claim 9, further comprising up to 5% of a binder selected from the group consisting of plaster of paris, Portland cement, and clay.

15. A method for preparing a fire retardant thermal insulation which comprises blending cellulosic insulation with from 20 to 35% by weight of the final blend of a particulate mixture comprising from about 60 to about 85% bauxite, from about 5 to about 30% boric acid, and from about 5 to about 30% dolomite.

16. A method as set forth in claim 15, wherein said particulate additive comprises from 60 to 75% by weight bauxite, from 15 to 25% boric acid, and from 10 to 20% dolomite.

17. A method as set forth in claim 16, wherein said mixture further comprises up to 5% of a binder selected from the group consisting of plaster of paris, Portland cement, and clay.

18. A method as set forth in claim 15, wherein said cellulosic insulation comprises recycled paper.

* * * * *